May 25, 1971 JEAN-PAUL LANNEGRACE 3,580,827

ETCHING METHOD AND APPARATUS

Filed July 23, 1968 2 Sheets-Sheet 1

1

3,580,827
ETCHING METHOD AND APPARATUS
Jean-Paul Lannegrace, Neuilly-sur-Seine, France, assignor to Imprimerie Chaix-Desfosses-Neorgravure, Paris, France
Filed July 23, 1968, Ser. No. 746,915
Claims priority, application France, July 27, 1967, 115,993
Int. Cl. B23p *1/00*
U.S. Cl. 204—143 2 Claims

ABSTRACT OF THE DISCLOSURE

To etch an electrically conducting metal surface, this surface is attacked with a liquid mordant through a photographically treated resist which is semi-permeable to the mordant, while varying the composition of the mordant such that the etching rate tends to lag slightly behind the ideal theoretical rate, this lag being compensated by applying to the surface a positive electrical potential with respect to the mordant.

This invention relates to a method of, and apparatus for, etching an electrically conducting metal surface for use in printing, by progressively attacking parts of the surface with a liquid mordant through a specially-prepared resist which is semi-permeable to the mordant. The invention relates more particularly to a method and apparatus in which a positive electrical potential with respect to the mordant is applied to the surface during etching, and in which the value of the applied potential can be varied in time.

The main object of the invention is to provide a method and apparatus of improved efficiency, more particularly with regard to the uniformity of etching in areas which need to be etched out to the same depth.

Accordingly the invention provides a method of etching an electrically conducting metal surface for use in printing, comprising the steps of attacking parts of the surface with a liquid mordant through a resist which is semi-permeable to the mordant, applying a positive electrical potential with respect to the mordant to the surface during etching, varying the composition of the mordant during the etching in a manner corresponding to a theoretical rate of etching slightly slower than the ideal theoretical rate, detecting the difference between the actual state of etching and the ideal theoretical rate at the same moment and correcting this difference by varying the said positive electrical potential.

There is further provided apparatus for etching a metal surface by the method of the invention in which the surface to be etched is constituted by the cylindrical surface of a rotatable cylinder partly immersed in a mordant contained in a tank, the inner wall of the tank being lined with electrically conductive elements which are electrically connected to the negative pole of a source of electric potential whose positive pole is connected to the cylindrical surface.

The invention is of particular application in photogravure, in which a copper cylinder is attacked by a mordant in the form of an aqueous solution of iron perchloride.

Figure 2:
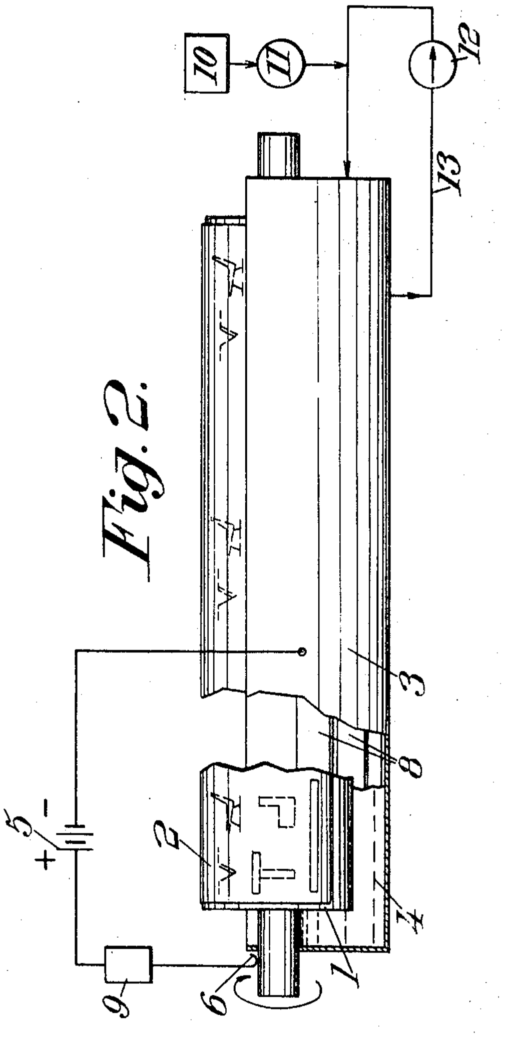
Figure 1:
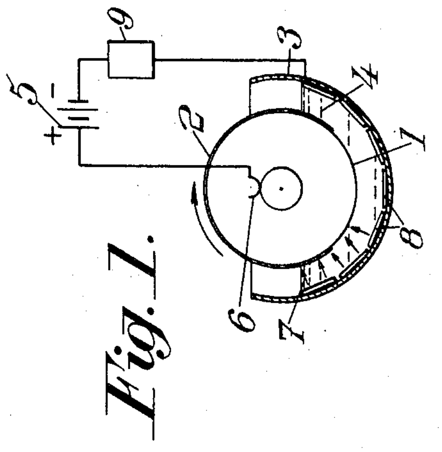
Figure 3:
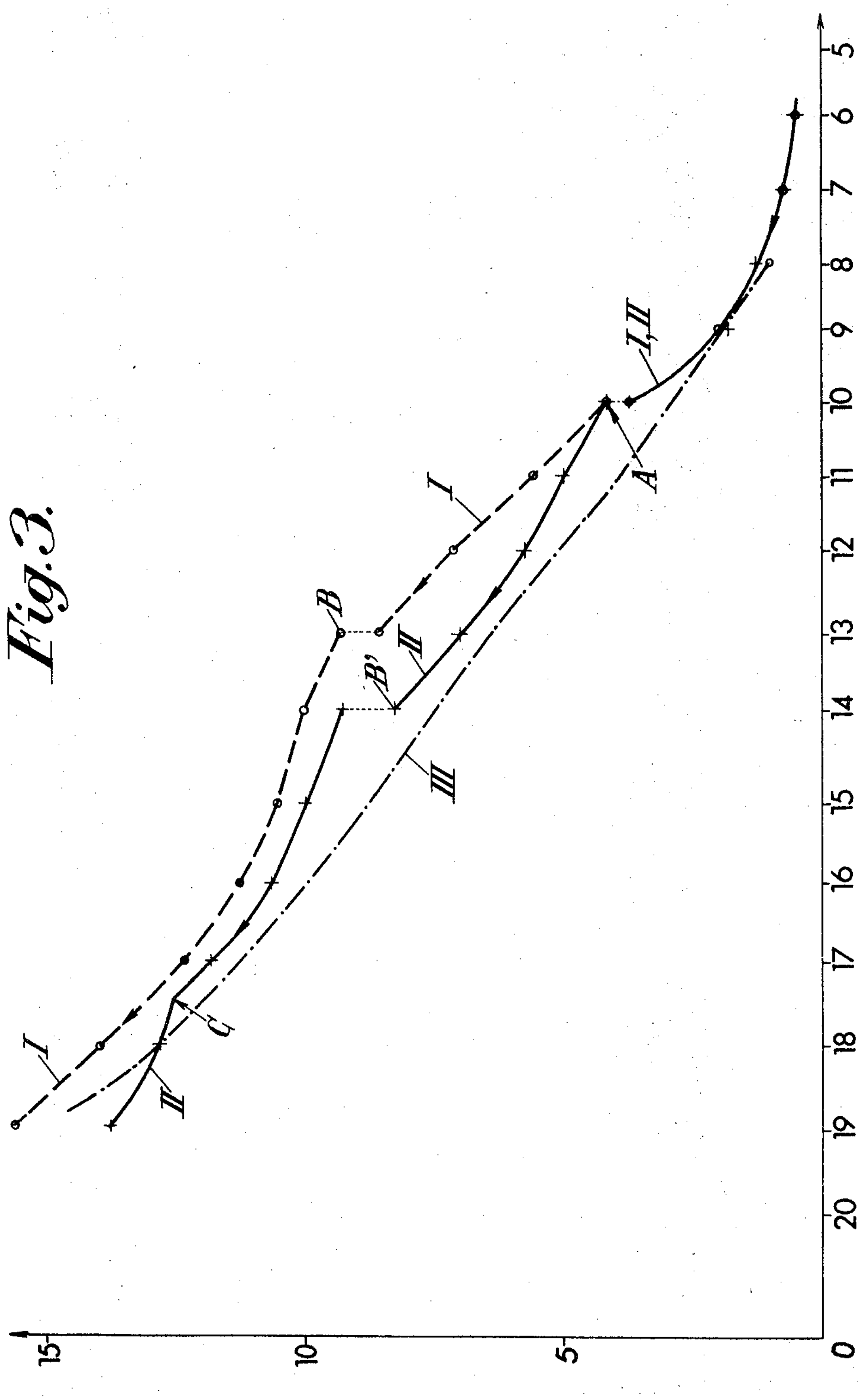

In order that the invention may be clearly understood,

2 an exemplary embodiment thereof will now be described with reference to the accompanying drawings, in which:

FIGS. 1 and 2 are respectively a cutaway end view and a cutaway side view of an etching apparatus embodying the invention; and FIG. 3 is a graph showing the progress of etching performed by an exemplary method embodying the invention.

In the exemplary method, which relates to the etching of a metal surface for subsequent use in photogravure printing, the precedure is substantially as follows.

The surface to be etched is first covered in known manner with a specially-prepared, semi-permeable resist (preferably by photography, first through a screen and then through a transparent positive image of the shape to be etched). Then the surface coated in the aforementioned manner is partly immersed in a bath of mordant having a given composition.

The mordant rapidly penetrates the most permeable areas of the resist and then progressively attacks the parts of the metal surfaces in contact with it.

Hitherto, the composition of the mordant has, as a rule, been progressively altered to achieve the successive etching out of different areas of the attacked surface corresponding to differently-coloured shapes for printing. In the usual case, where the mordant was an aqueous solution of iron perchloride, the solution was progressively diluted so that it changed from 43° to 39° Baumé during etching.

This process has several disadvantages; more particularly, it is very difficult to determine the precise moments at which the composition of the mordant should be altered, and the amount of alteration; furthermore, the response to this procedure is delayed, since there will inevitably be a consiredable time-lag between the moment where it is found necessary to alter the composition of the mordant and the moment when the composition has been altered homogeneously in the impregnated resist.

It has also been proposed to apply an electric potential between a surface to be etched, comprising an electrically conducting substance, and a mordant of constant composition forming the electrolyte, so as to vary the speed of etching in the areas where the resist is already impregnated with mordant, with the object of relieving the means used for impregnating the resist from control of the attack on the surface to be etched.

The Applicant has discovered that two obstacles have to be surmounted by this method, more particularly in the case where an aqueous solution of iron perchloride is used, as described above.

Firstly, it has been found that, particularly in the last-mentioned case, the applied electric potential affects the speed with which the resist is impregnated, and that this effect is considerably greater than the electrolytic acceleration of etching is areas already impregnated; so much so, that the second effect can be neglected with respect to the first.

Secondly, it has been found that, although the electric potential can be used at will to act on the final amount of etching, merely by varying the speed with which the resist is impregnated by the mordant, it is impossible to choose a constant composition for the iron chloride during the whole operation such that the thin areas of the resist are impregnated sufficiently slowly at the same time as the cavities under the thick areas have a sufficiently uniform depth.

The method according to the invention obviates these disadvantages. According to the invention, control of the impregnation of the resist is effected mainly by the tested method of progressively diluting the mordant in a predetermined manner, such that the degree of impregnation due to the dilution is less than that corresponding to the ideal rate, i.e. the rate at which the etching proceeds in the required manner so as to reproduce all the details in the shapes for subsequent printing, and the additional impregnation required at each moment to achieve the ideal rate of etching is produced electrically.

The electrical potential, therefore, only exerts a compensating action, but this action is perfectly reliable, owing to the flexibility, accuracy and the instantaneous manner in which it is applied, and can compensate both the systematic errors in the dilution of the mordant and any chance, inevitable variations in the properties of the resist, the mordant, and the ambient medium.

The compensating electric potential can be modified fairly easily, merely by adjusting a potentiometer sliding contact.

The value of the potential to be applied at a given instant can be found by comparing the actual progress of etching at that instant with the required rate of progress The comparison can advantageously be made with one or other of the devices described in the first French Patent of Addition No. 86,998 filed on Dec. 14, 1964, and granted on Apr. 12, 1966, and second French Patent of Addition No. 89,325 filed on Nov. 10, 1965, and granted on May 2, 1967, both these patents being additions to French Pat. No. 1,390,307, filed on Jan. 9, 1964, and granted on Jan. 18, 1965. The aforesaid devices comprise instruments for visual observation, such as microscopes, and automatic instruments such as photo-electric cells; in these devices, the means affecting the amount of dilution of the mordant merely have to be replaced by a system which can generate a variable electric potential in response to the detected difference between the actual and desired progress of etching.

The potential, of course, can be continuous or intermittent.

Since the response time of the variation in the amount of impregnation caused by the adjustment in electrical potential is shorter than the response time of the variation caused by the dilution of the mordant, the rate of etching will be closer to the ideal rate when the said electrical potential adjustment is used.

In an advantageous embodiment of the etching apparatus illustrated in FIGS. 1 and 2, the surface to be etched is constituted as the cylindrical surface 1 of a rotatable cylinder made or coated with copper.

The cylinder, which bears specially prepared semipermeable resist sheets 2, is mounted for rotation about its horizontally disposed axis above a trough-shaped tank 3 containing mordant 4.

The positive pole of a source 5 of electric potential is connected to the surface 1, e.g. via a fixed contact 6 rubbing against an annular, electrically conducting part of the cylinder surface.

The negative pole of the source 5 is connected to an electric arrangement 8 which is immersed in the mordant and which preferably consists of an array of bars made of graphite or other electrically conducting material coating the inner surface of tank 3 and distributed like the bars of a cylindrical cage coaxial with the surface 1 to be etched.

Arrows 7 in FIG. 1 illustrate the effect of the electric potential on the mordant bath, resulting in an increase in the speed with which the mordant penetrates the resist.

The potential generated by source 5 and applied to the mordant between surface 1 and cathode 8 is preferably between 0.5 and 20 volts but can of course be outside this range.

The potential applied between the surface 1 and the electrode arrangement 8 can be adjusted by manual or automatic means shown diagrammatically by rectangle 9. Adjustments can be made to the instantaneous value of the potential or to the relative lengths of the periods when the potential is turned off or reduced, if the potential is chopped. Alternatively, both factors can be adjusted.

FIG. 2 diagrammatically shows a programming unit 10 which can automatically control the dilution of mordant according to the predetermined rate defined above, by acting on a proportioning pump 11 which can introduce a liquid diluent into the mordant, which is constantly circulated through a circuit 13 by a pump 12.

Exemplary details of the construction and operation of a specific apparatus made in accordance with FIGS. 1, 2 will now be given merely by way of illustration.

In the specific apparatus under consideration, surface 1 was made of copper, mordant 4 was an aqueous solution of iron perchloride initially at 43.5° Baumé and the progress of the etching was divided into 20 successive phases which could be measured by the times when etching began in 20 different areas of decreasing permeability in a "scale" provided on Sheet 2. The beginning of etching was shown when the areas changed from bright red to anthracite grey in about 20 seconds. The two end areas in the scale corresponded to optical densities of 0 and 200 respectively in the documents to be printed.

The semi-permeable resist 2 was a layer of Autotype G 21 gelatine, sensitised by an aqueous solution of 35 g./l. potassium bichromate for 3 minutes at a temperature of 10° C., then exposed for 8 minutes to a light source of 15,000 lux.

The hygroscopic index was 65 and the temperature was 20.5° C.

Two successive tests were made under these conditions, and the respective results are shown by curves I and II on the graph in FIG. 3, where the ordinates show the time expressed in minutes, and the abscissae show the numbers of the different areas in the scale. The areas which were first etched are furthest to the right on the graph.

Curve III is the ideal theoretical curve.

In the first or control test I, no electric potential was applied. The composition of the mordant was merely changed twice. At the time A (4 minutes after the beginning of etching) the initial solution of iron perchloride $FeCl_3$ at 43.5° Baumé was replaced by an aqueous solution of the same salt at 41.7° Baumé. At B (9 minutes after the beginning of etching) the solution was replaced by an aqueous solution of the same salt at 39.9° Baumé.

As can be seen, the etching essentially corresponding to an attack on areas 6 to 19 occurs in approximately 15½ minutes.

The only difference between tests II and I was that, in the second test, an electric potential of 3 v. and 25 a. was applied at the point A when the solution was first diluted, and a potential of 12 v. and 6 a. was applied at the point C, 12½ minutes after the beginning of etching, i.e. after the second dilution at B'.

As can be seen, the impregnation of the resist by the mordant is accelerated by the electrical compensation; this results in the angles in curve II at A and at C, compared with curve I. Curve III can thus be approached at will, or can be intersected.

It was also found that the etching was extremely regular and without rough edges, since the electric potential apparently had a good effect on the direction of the attack on the metal and on the direction in which the waste matter was evacuated.

I claim:

1. In the method of etching an electrically conducting metal surface for use in printing, comprising the steps of applying to the surface a resist which is semi-permeable to a liquid mordant, subjecting parts of the surface to the action of the liquid mordant through impregnation of the resist, and applying to the surface during etching, a positive electrical potential with respect to the mordant, the improvement which comprises the steps of:

adjusting the composition of the mordant during etching to correspond to a rate of etching slightly lower than the ideal theoretical rate, detecting the difference between the actual state of etching and the ideal theoretical state at any given moment, and adjusting the electric potential applied to the surface so as to control the rate of impregnation of the resist by the mordant to correct said difference at said moment.

2. A method of etching as claimed in claim 1, wherein the potential is between 0.5 and 20 volts.

References Cited

UNITED STATES PATENTS

| | | | |
|---|---|---|---|
| 1,275,408 | 8/1918 | Eaton | 204—143 |
| 1,884,512 | 10/1932 | Ballard | 204—212 |
| 3,271,282 | 9/1966 | Borth | 204—143 |

PATRICK P. GARVIN, Primary Examiner

C. F. DEES, Assistant Examiner

U.S. Cl. X.R.

204—212